July 22, 1952 J. J. ORANGE 2,604,058
MOLD
Filed July 2, 1948
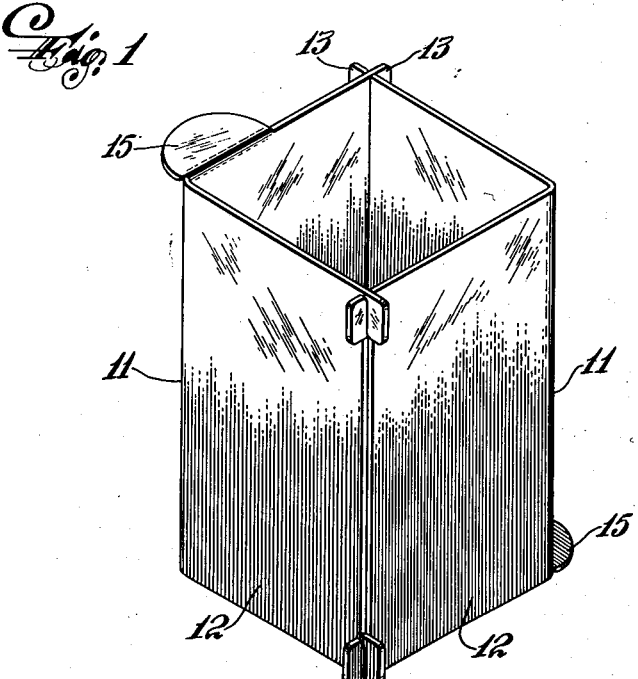
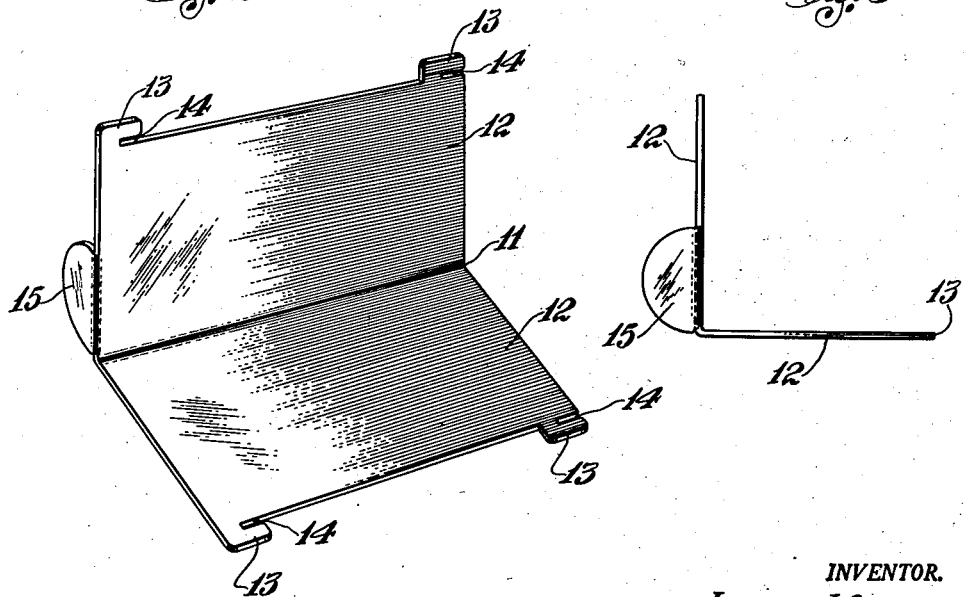
INVENTOR.
Jerome J. Orange
BY Norman N. Popper
ATTORNEY Patented July 22, 1952

2,604,058

UNITED STATES PATENT OFFICE 2,604,058

MOLD

Jerome J. Orange, Maplewood, N. J.

Application July 2, 1948, Serial No. 36,692

1 Claim. (Cl. 107—19)

My invention relates generally to molds and specifically to molds which are constructed in several easily separable parts.

It is among the objects of my invention to supply a mold that is easily separable and easily put together.

It is another object of my invention to supply a mold from which the molded article may be easily discharged.

Yet another object of my invention is to supply a mold for margarin, butter, ice cream, and similar foods, whereby they may be formed into convenient size for use, for storage, or for preservation.

A still further object of my invention is to provide a readily separable mold for use in freezing foods.

And among the other objects of my invention is to provide a mold which is simple in form, easy and inexpensive to construct, simple to use, and durable.

These objects and advantages, as well as other objects and advantages will be apparent from a consideration of the drawings in which:

Figure 1 is a view in perspective of the assemblage showing my invention;

Figure 2 is a view in perspective of one element of my invention; and

Figure 3 is an end view of that element.

My mold is simple to construct because it has only two parts, each of which is exactly like the other. The single pieces making up my mold have the form of a sheet or body member 11. This sheet 11 is bent along its length at the center line to form two equal walls 12, 12 which are disposed to each other preferably at an angle of 90°.

Along the longitudinal edges, a plurality of hooks 13 are located, preferably extending in the plane of the sheet. The hooks 13 form slots 14 into which corresponding hooks may be fitted. The hooks all look in one direction. One of the walls 12, 12 has a handle or tab 15 preferably a semicircular lug extending perpendicular to the wall 12. Having the two equal parts which go to make up my mold, one member 11 is reversed so that the hooks 13 point in a direction opposite to the hooks 13 on the other member 11. The slots 14 are then moved toward each other so that the body members 11 mesh as in Figure 1. The mold is then ready for use. The body members 11 are easily disengaged by grasping the handles 15, 15 and pulling in opposite directions.

This mold has many uses. After a block of margarin has been colored, it may be pressed into the mold and its temperature lowered in a refrigerator until it becomes relatively solid in a satisfactory form. Butter also may be restored to neat form in the same way. Home made ice cream may be pressed into the mold when it is partially frozen, so that when it is finally frozen, it will have an appetizing appearance.

With the introduction of quick freeze apparatus into general use in the home, my mold can be used to contain vegetables and other foods, while they are being frozen. They are then in a compact, solid mass and may easily be taken from the mold and stored until ready for use. For illustration, the drawings show one embodiment of my invention.

Many changes may be made in the construction, selection and arrangement of the various elements comprising my invention, all within the scope of the appended claim without departing from the spirit of the invention.

I claim:

A mold comprising a pair of non-resilient imperforate body members, a longitudinal bend in each body member whereby two sidewalls of the mold are formed and disposed at an angle to each other, hooked extensions at the top and bottom of the longitudinal edges of each sidewall, said hooked extensions extending in the same direction, and one of said body members being reversed so that its hooked extensions extend in a direction opposite to those of the other body member and slidably disposed in cooperative engagement with the hooked extensions of the said other body member with the latitudinal edges of the body members in coincidence with each other.

JEROME J. ORANGE.

REFERENCES CITED

The following references are of record in the file of this patent:

UNITED STATES PATENTS

| Number | Name | Date |
|---|---|---|
| 1,061,297 | Johnson | May 13, 1913 |
| 1,478,801 | Slye | Dec. 25, 1923 |
| 1,501,659 | Haddad | July 15, 1924 |
| 1,608,323 | Knight | Nov. 23, 1926 |
| 1,708,304 | Elliott | Apr. 9, 1929 |
| 1,801,160 | Ingoglia | Apr. 14, 1931 |
| 1,866,316 | Miller | July 5, 1932 |
| 1,923,881 | Palais | Aug. 22, 1933 |